G. A. ERICKSON.
SIGNAL FOR AUTOMOBILES.
APPLICATION FILED MAR. 18, 1920.
1,371,304.
Patented Mar. 15, 1921.
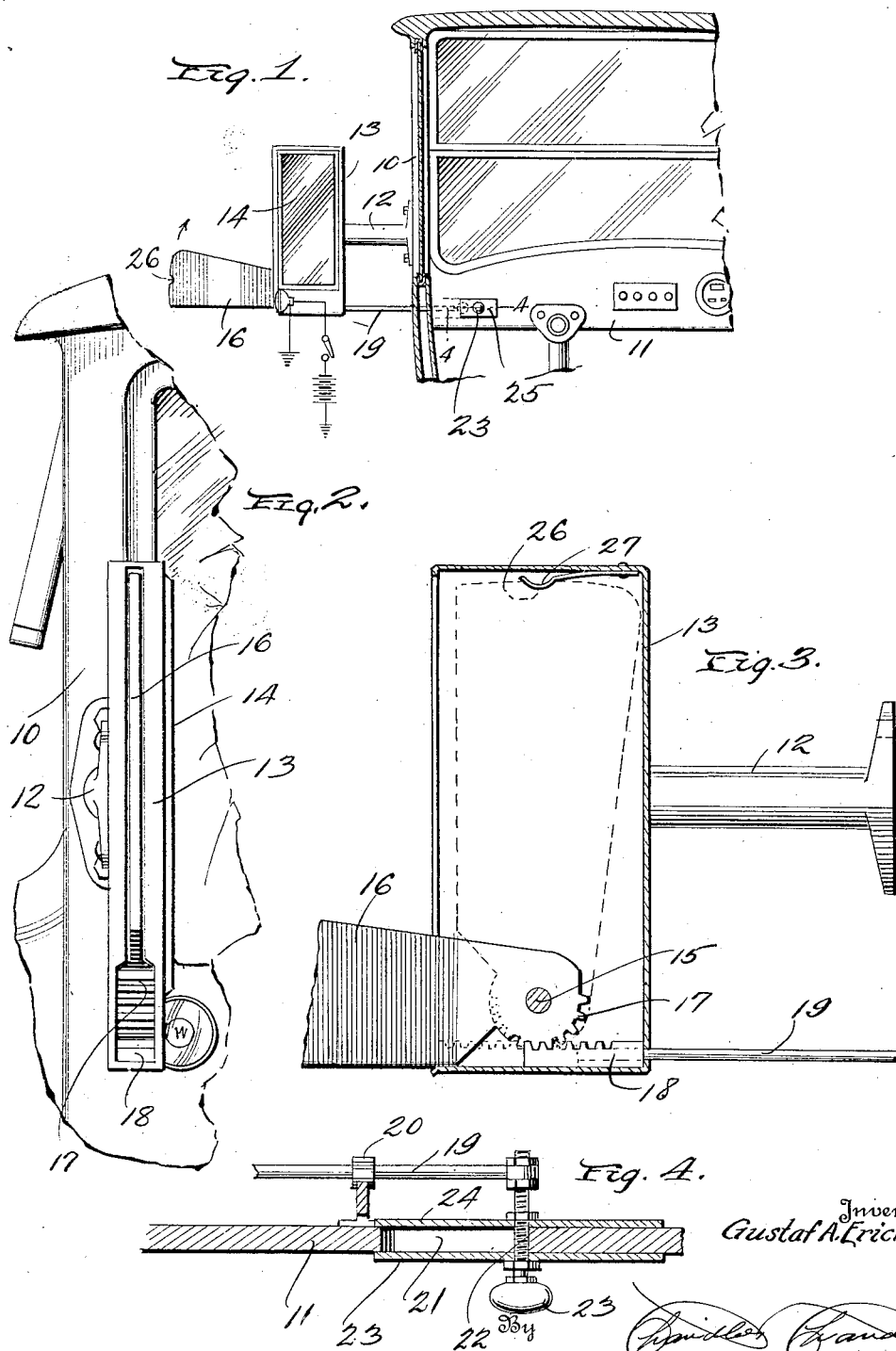
Inventor
Gustaf A. Erickson

UNITED STATES PATENT OFFICE.

GUSTAF A. ERICKSON, OF DETROIT, MICHIGAN.

SIGNAL FOR AUTOMOBILES.

1,371,304.  Specification of Letters Patent.  Patented Mar. 15, 1921.

Application filed March 18, 1920. Serial No. 366,947.

*To all whom it may concern:*

Be it known that I, GUSTAF A. ERICKSON, a citizen of the United States, residing at Detroit, in the county of Wayne, State of Michigan, have invented certain new and useful Improvements in Signals for Automobiles; and I do hereby declare the following to be a full, clear, and exact description of the invention, such as will enable others skilled in the art to which it appertains to make and use the same.

This invention relates to new and useful improvements in signals and particularly to signals for automobiles.

One object of the present invention is to provide a novel and improved device which combines a mirror to permit the driver to see vehicles approaching from the rear, with a means for signaling to such vehicles that a change of direction is to be made.

Another object is to provide a novel and improved device of this character wherein, when the signal is in non-indicating position, said signal is hidden from view, and the mirror only in view.

A further object is to provide a novel and improved device of this character which can be easily and quickly applied to automobiles now in use, and especially to closed automobiles of the sedan type.

Other objects and advantages will be apparent from the following description when taken in connection with the accompanying drawing.

In the drawing:

Figure 1 is an elevation of the invention viewed from the driver's seat, the automobile being partly in section and partly broken away, and with the signal arm in lowered or indicating position.

Fig. 2 is a view of the device and portion of the automobile as seen from the side of the automobile, with the signal arm in raised or non-indicating position.

Fig. 3 is a view similar to Fig. 1, with the mirror wall at the rear removed.

Fig. 4 is a horizontal section on the line 4—4 of Fig. 1.

Referring particularly to the accompanying drawing, 10 represents one of the vertical side posts of the windshield of the automobile, and 11 the instrument board, in connection with which the present device is used.

A bracket arm 12 is detachably secured to the post 10 and extends horizontally outward therefrom. Secured on the outer end of the arm is a vertical casing 13 the rear face of which is in the form of an elongated mirror 14 in which the driver of the automobile can see other vehicles which are in the rear. Extending transversely through the lower end of the casing is a shaft 15 on which is pivotally mounted a semaphore arm 16, and which is adapted to lie vertically within the casing at times, and to extend horizontally outward therefrom, at the side of the automobile to be seen by other vehicles, and whereby other vehicles will be notified of a proposed change in direction of the automobile. The pivotal portion of the semaphore arm 16 is formed with a segmental pinion 17 which meshes with the teeth of the rack 18 formed on the adjacent end of a rod 19 which is slidably mounted in brackets 20 on the rear face of the dashboard 11. Formed in the upper portion of the dashboard, just below the lower side of the windshield, is a horizontal transverse slot 21 through which is disposed a stem 22 having its forward end connected with the adjacent end of the rod 19, and on its rear end a knob 23 which is adapted to be grasped by the driver to move the stem and cause the rod to slide the rack 18 and rotate the semaphore arm into lowered operative position. The weight of the semaphore arm maintains the same in lowered position, it being necessary to move the stem through the slot in the opposite direction to swing the arm upwardly within the casing. Secured to the stem 22, forwardly of the dashboard, and also to the rear thereof, are the follower plates 24 and 25 which fit against the opposite faces of the dashboard, and are of a length to maintain the slot closed when the stem is moved in either direction. Thus no wind or moisture can pass through the slot at any time.

In normal position, with the semaphore arm in elevated position within the casing, the casing, with its mirror, serves the purpose of a means for permitting the driver to see other vehicles which are behind him.

In the upper end of the semaphore arm there is formed a notch 26 which receives the end of a leaf spring 27, secured in the upper end of the casing, and whereby said arm is held in elevated position until moved by the rod 19. This spring prevents the arm from accidentally being jarred out of its position in the casing and falling into indicating position when not desired by the driver.

What is claimed is:

A signal device for an automobile comprising a casing having a movable semaphore arm mounted therein, and means for operating the arm comprising a guide on the dashboard of the automobile, said dashboard having a transverse slot adjacent the guide, a rod slidable through said guide, a pair of elongated plates disposed respectively outwardly and inwardly of the slot, and an operating stem disposed through the slot and secured to the said plates and adjacent end of the rod.

In testimony whereof I affix my signature in the presence of two witnesses.

GUSTAF A. ERICKSON.

Witnesses:
 EDMUND L. EBERT,
 MABEL RICHARDS.